United States Patent
Hwang et al.

(10) Patent No.: US 10,917,214 B2
(45) Date of Patent: Feb. 9, 2021

(54) COMMUNICATION METHOD AND MTC DEVICE USING NARROWBAND

(71) Applicant: LG ELECTRONICS INC., Seoul (KR)

(72) Inventors: Daesung Hwang, Seoul (KR); Joonkui Ahn, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/756,954

(22) PCT Filed: Sep. 8, 2016

(86) PCT No.: PCT/KR2016/010066
§ 371 (c)(1),
(2) Date: Mar. 1, 2018

(87) PCT Pub. No.: WO2017/043876
PCT Pub. Date: Mar. 16, 2017

(65) Prior Publication Data
US 2018/0248668 A1 Aug. 30, 2018

Related U.S. Application Data

(60) Provisional application No. 62/365,388, filed on Jul. 22, 2016, provisional application No. 62/216,989, filed on Sep. 10, 2015.

(51) Int. Cl.
*H04L 5/00* (2006.01)
*H04W 4/00* (2018.01)
(Continued)

(52) U.S. Cl.
CPC .......... *H04L 5/0053* (2013.01); *H04L 5/0094* (2013.01); *H04W 4/00* (2013.01);
(Continued)

(58) Field of Classification Search
CPC ..... H04L 5/0053; H04L 5/0094; H04L 5/001; H04W 4/70; H04W 4/50; H04W 4/00;
(Continued)

(56) References Cited

U.S. PATENT DOCUMENTS 9,750,026 B1* 8/2017 Saxena ............ H04W 72/0453
9,913,263 B2* 3/2018 Park .................. H04W 72/0413
(Continued)

FOREIGN PATENT DOCUMENTS

CN 103517420 1/2014
CN 103517429 1/2014
(Continued)

OTHER PUBLICATIONS

PCT International Application No. PCT/KR2016/010066, Written Opinion of the International Searching Authority dated Dec. 15, 2016, 4 pages.
(Continued)

*Primary Examiner* — Khaled M Kassim
(74) *Attorney, Agent, or Firm* — Lee Hong Degerman Kang & Waimey

(57) ABSTRACT

One disclosure of the present specification provides a method for performing, by a machine type communication (MTC) device, communication using a narrowband. The method may comprise the steps of: receiving setting information on a narrowband which can be used for communication, wherein the setting information comprises at least one narrowband which can be used according to at least one physical channel; determining a narrowband for a physical channel for communication on the basis of the setting information; and performing communication with respect to the physical channel using the determined narrowband.

14 Claims, 13 Drawing Sheets

(51) Int. Cl.
  *H04W 4/50* (2018.01)
  *H04W 4/70* (2018.01)
  *H04W 48/16* (2009.01)
  *H04W 72/04* (2009.01)
  *H04W 74/08* (2009.01)
  *H04W 76/27* (2018.01)

(52) U.S. Cl.
  CPC ............... *H04W 4/50* (2018.02); *H04W 4/70* (2018.02); *H04W 48/16* (2013.01); *H04W 72/0453* (2013.01); *H04W 74/0833* (2013.01); *H04L 5/001* (2013.01); *H04W 76/27* (2018.02)

(58) Field of Classification Search
  CPC ............. H04W 48/16; H04W 72/0453; H04W 74/0833; H04W 76/27
  See application file for complete search history.

(56) References Cited

U.S. PATENT DOCUMENTS

| | | | |
|---|---|---|---|
| 10,075,979 B2* | 9/2018 | Lee | H04W 74/0833 |
| 10,103,847 B2* | 10/2018 | Xiong | H04L 1/1854 |
| 10,135,487 B2* | 11/2018 | Horiuchi | H04L 5/0053 |
| 2013/0182680 A1 | 7/2013 | Choi et al. | |
| 2014/0247781 A1 | 9/2014 | Somasundaram et al. | |
| 2015/0181603 A1 | 6/2015 | Wakabayashi | |
| 2015/0264718 A1* | 9/2015 | Yu | H04W 72/02 370/329 |
| 2016/0302092 A1* | 10/2016 | Sartori | H04W 52/0209 |
| 2017/0070991 A1* | 3/2017 | Subramanian | H04W 16/28 |
| 2017/0353272 A1* | 12/2017 | Takeda | H04L 1/16 |
| 2018/0019855 A1* | 1/2018 | Zhang | H04L 1/00 |
| 2018/0270771 A1* | 9/2018 | Chendamarai Kannan | H04J 11/0073 |
| 2018/0317198 A1* | 11/2018 | Lee | H04W 4/70 |

FOREIGN PATENT DOCUMENTS

| | | |
|---|---|---|
| CN | 103684675 | 3/2014 |
| CN | 103959694 | 7/2014 |
| CN | 104365165 | 2/2015 |
| CN | 104380820 | 2/2015 |
| CN | 104604315 | 5/2015 |
| CN | 104737488 | 6/2015 |

OTHER PUBLICATIONS

Huawei, "On the specification and use of narrowbands," 3GPP TSG-RAN WG1 #82, R1-153750, Aug. 2015, 7 pages.
Nokia Networks, "Narrowband definition for MTC," 3GPP TSG-RAN WG1 #82, R1-153825, Aug. 2015, 5 pages.
Lenovo, "Consideration of narrowband definition for MTC UEs," 3GPP TSG-RAN WG1 #82, R1-154496, Aug. 2015, 5 pages.

* cited by examiner

COMMUNICATION METHOD AND MTC DEVICE USING NARROWBAND

CROSS-REFERENCE TO RELATED APPLICATIONS

This application is the National Stage filing under 35 U.S.C. 371 of International Application No. PCT/KR2016/010066, filed on Sep. 8, 2016, which claims the benefit of U.S. Provisional Application No. 62/216,989, filed on Sep. 10, 2015 and 62/365,388, filed on Jul. 22, 2016, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user. Meanwhile, since the existing LTE system has been designed for the purpose of supporting high-speed data communication, it has been regarded as an expensive communication method. However, the MTC may be widely used only when a price is low according to a characteristic thereof. Therefore, a method of reducing a bandwidth for MTC to be smaller than a system bandwidth has been examined for cost reduction.

When the bandwidth for the MTC is decreased, a peak/average data rate may be limited. However, as the MTC is applied in various fields, there has been a need for a higher peak/average data rate. Therefore, according to the application field of the MTC, there is a need for a solution capable of providing flexibility or scalability of the peak/average data rate.

SUMMARY OF THE INVENTION

Accordingly, a disclosure of the present specification has been made in an effort to solve the aforementioned problem.

To achieve the aforementioned purpose, a disclosure of the present specification provides a method in which a machine type communication (MTC) device performs communication by using a narrowband. The method may include: receiving configuration information regarding a narrowband which can be used for the communication, wherein the configuration information including at least one narrowband which can be used for each of at least one physical channel; determining a narrowband for a physical channel to be used in the communication on the basis of the configuration information; and performing communication for the physical channel by using the determined narrowband.

The at least one narrowband may have a size greater than 6 resource blocks (RBs). In this case, the at least one narrowband may include an RB which cannot be configured by a narrowband of which a unit size is 6 RBs, among RBs in a full system bandwidth.

The configuration information may include a narrowband index and narrowband size for each of the at least one narrowband. In this case, the narrowband index may be received through downlink control information (DCI), and the narrowband size may be received through high layer signaling.

In the determining of the narrowband, if at least two physical channels are used in the communication and types of the at least physical channels are different from each other, a plurality of narrowbands having different sizes may be determined.

In the performing of the communication, if a size of the narrowband is changed depending on a change of the physical channel from a first channel to a second channel, a part of the first channel or the second channel may be transmitted/received by using a narrowband constructed of 6 RBs without having to conform to the configuration information.

To achieve the aforementioned purpose, another disclosure of the present specification provides an MTC device for performing communication by using a narrowband. The MTC device may include: a radio frequency (RF) unit transmitting/receiving a radio signal; and a processor controlling the RF unit. The processor may be configured to: control the RF unit to receive configuration information regarding a narrowband which can be used for the communication, wherein the configuration information includes at least one narrowband which can be used for each of at least one physical channel; determine a narrowband for a physical channel to be used in the communication on the basis of the configuration information; and perform communication for the physical channel by using the determined narrowband.

According to a disclosure of the present specification, it is possible to provide flexibility or scalability for a data rate or an available resource so that an MTC device can be applied to various fields.

DESCRIPTION OF EXEMPLARY EMBODIMENTS

Figure 1:
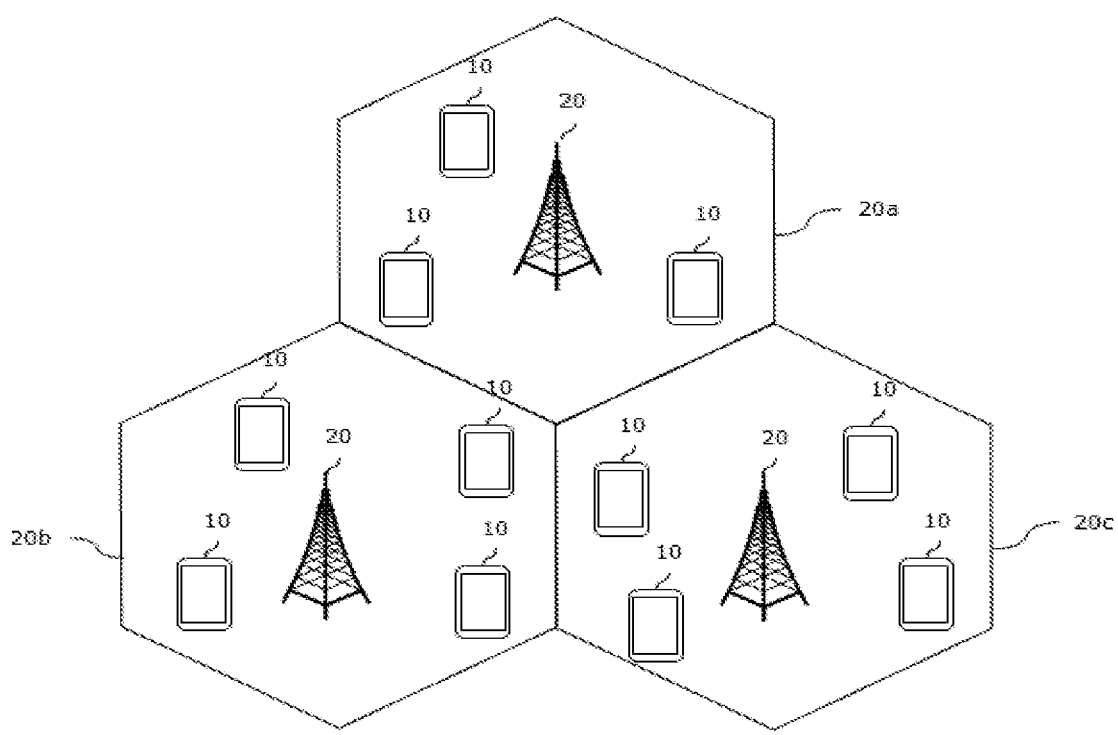
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEl 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
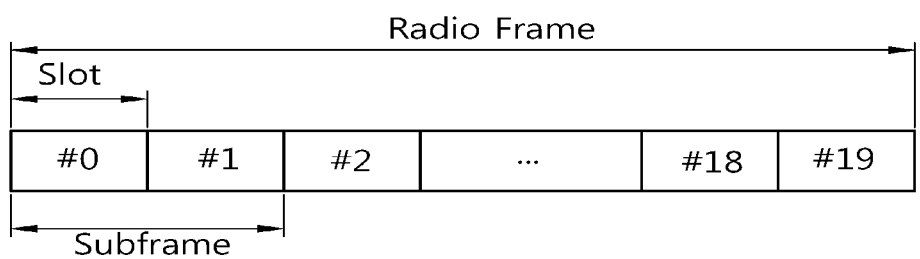
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
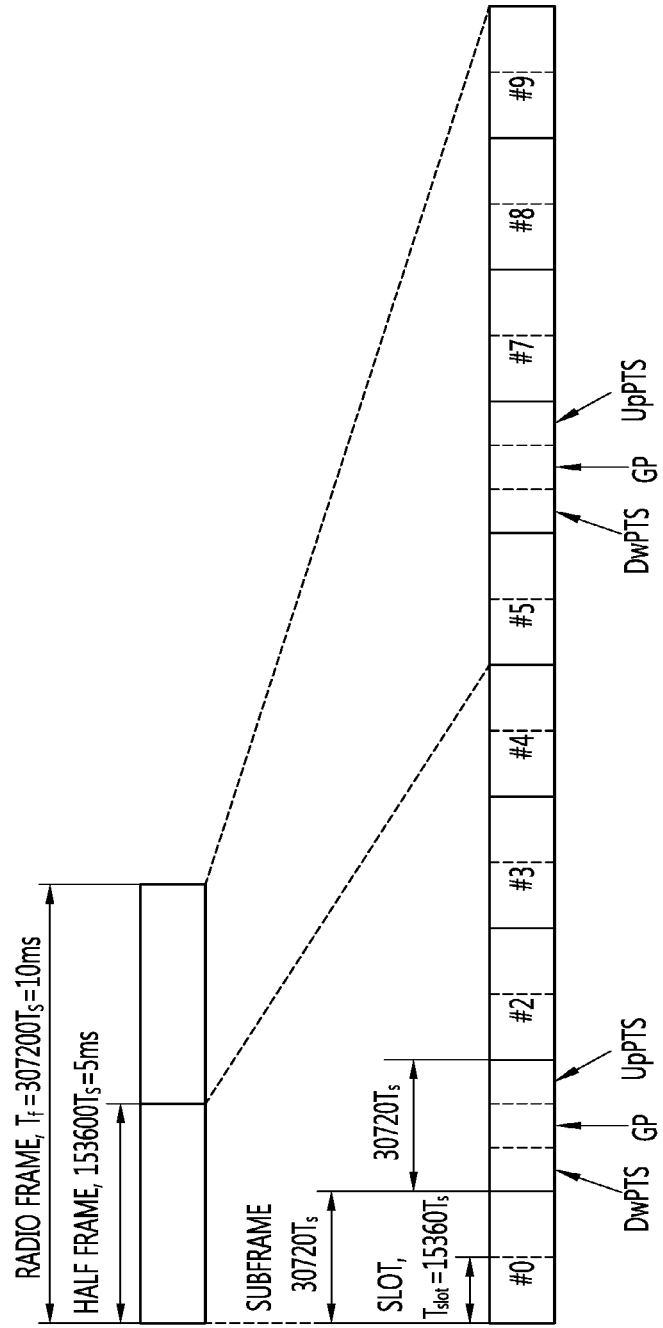
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame,
'U' a UL sub-frame, and
'S' a special sub-frame.

When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
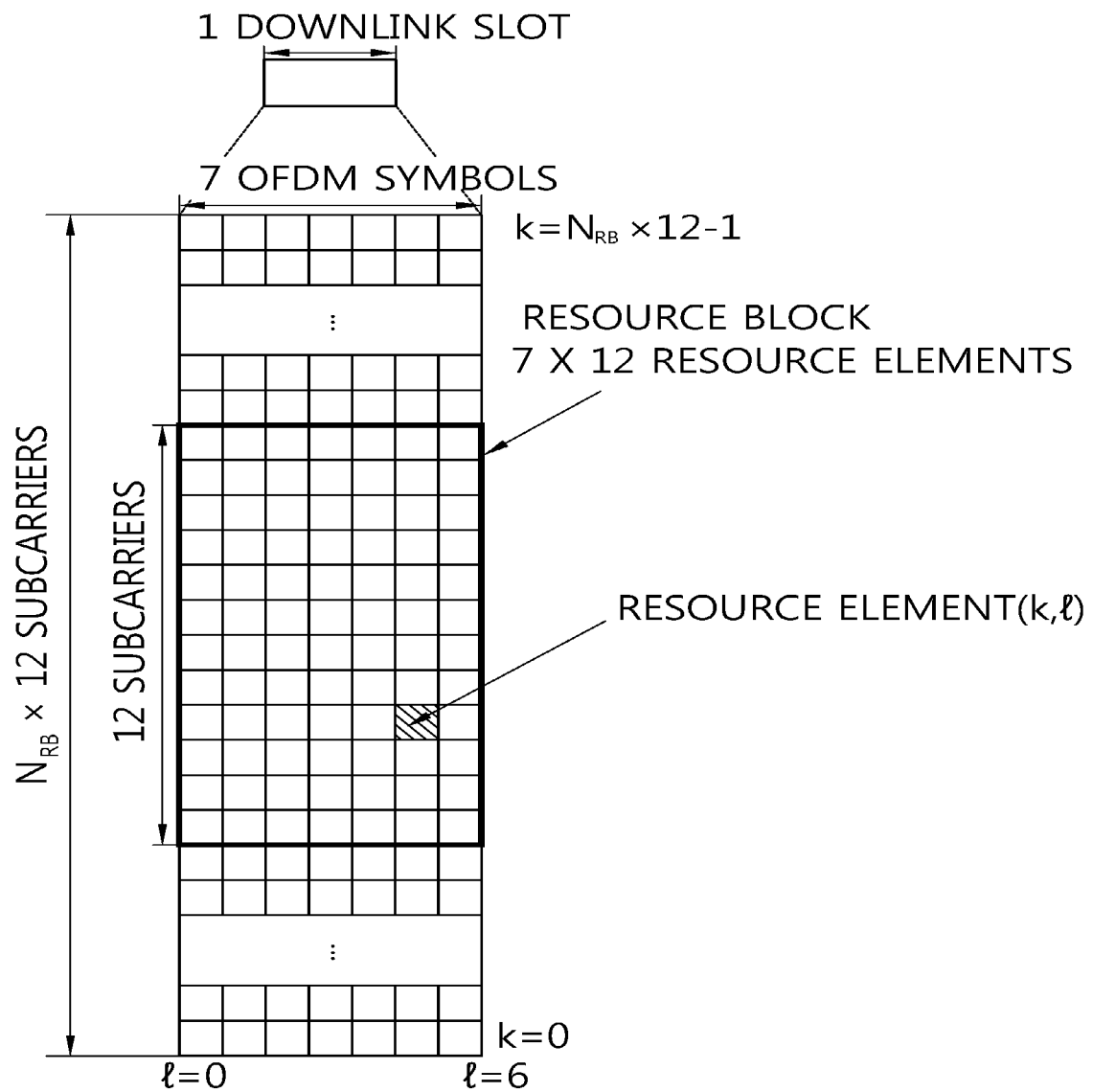
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

The 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

An uplink channel includes a PUSCH, a PUCCH, a sounding reference signal (SRS), and a physical random access channel (PRACH).

Figure 5:
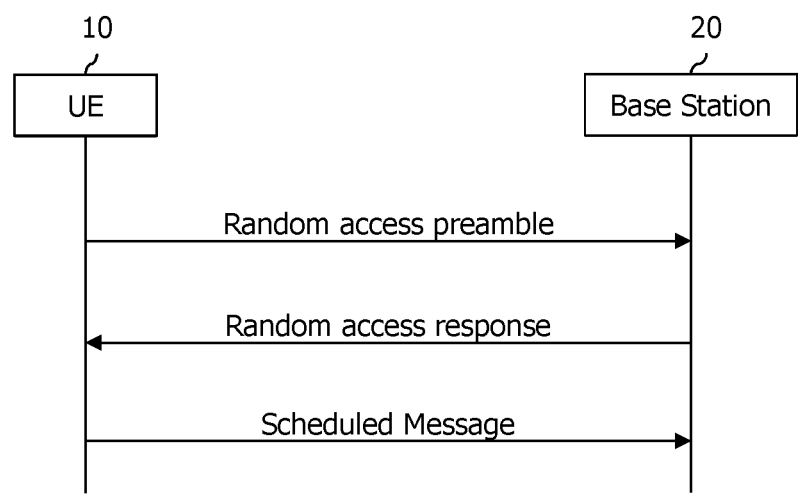
FIG. 5 is a flowchart showing a random access procedure in 3GPP LTE.

FIG. 5 is a flowchart showing a random access procedure in 3GPP LTE.

The random access procedure is used by the UE 10 to acquire an uplink (UL) synchronization with the BS 20 or to be allocated a UL radio resource.

The UE 10 receives a root index and a physical random access channel (PRACH) configuration index from the BS 20. Each cell has 64 candidate random access preambles defined by a Zadoff-Chu (ZC) sequence. The root index is a logical index for generating the 64 candidate random access preambles by the UE 10.

Transmission of the random access preamble is limited to a specific time and frequency resource for each cell. The PRACH configuration index indicates a specific subframe and preamble format capable of transmitting the random access preamble.

The UE 10 transmits a randomly selected random access preamble to the BS 20. The UE 10 selects one of the 64 candidate random access preambles. In addition, the UE 10 selects a corresponding subframe by using the PRACH configuration index. The UE 10 transmits the selected random access preamble in the selected subframe.

Upon receiving the random access preamble, the BS 20 transmits a random access response (RAR) to the UE 10. The RAR is detected in two steps. First, the UE 10 detects a PDCCH masked with a random access-radio network temporary identifier (RA-RNTI). The UE 10 receives the RAR included in a medium access control (MAC) protocol data unit (PDU) on a PDSCH indicated by the detected PDCCH.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier.

<Machine Type Communication (MTC)>

Meanwhile, hereinafter, the MTC will be described.

Figure 6A:
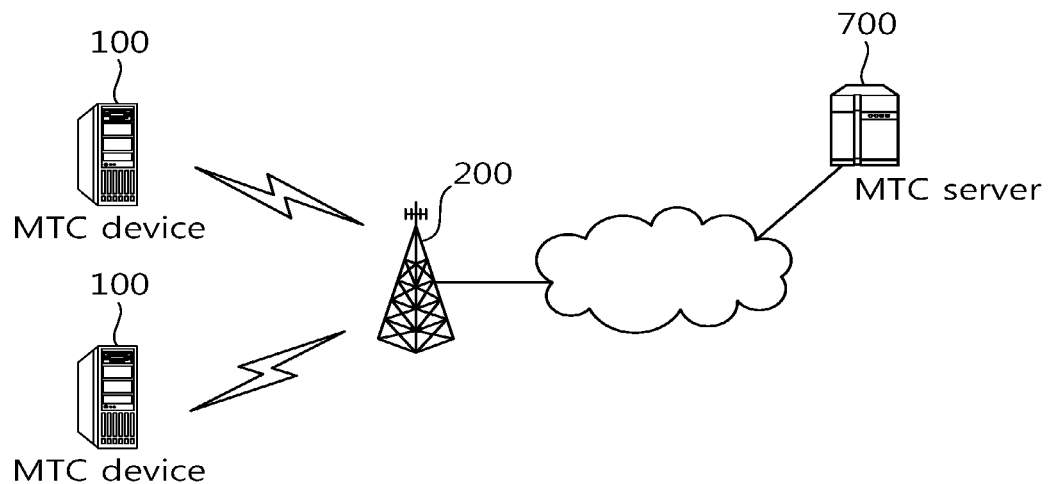
FIG. 6a illustrates an example of the machine type communication (MTC).

FIG. 6a illustrates an example of the machine type communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 6B:
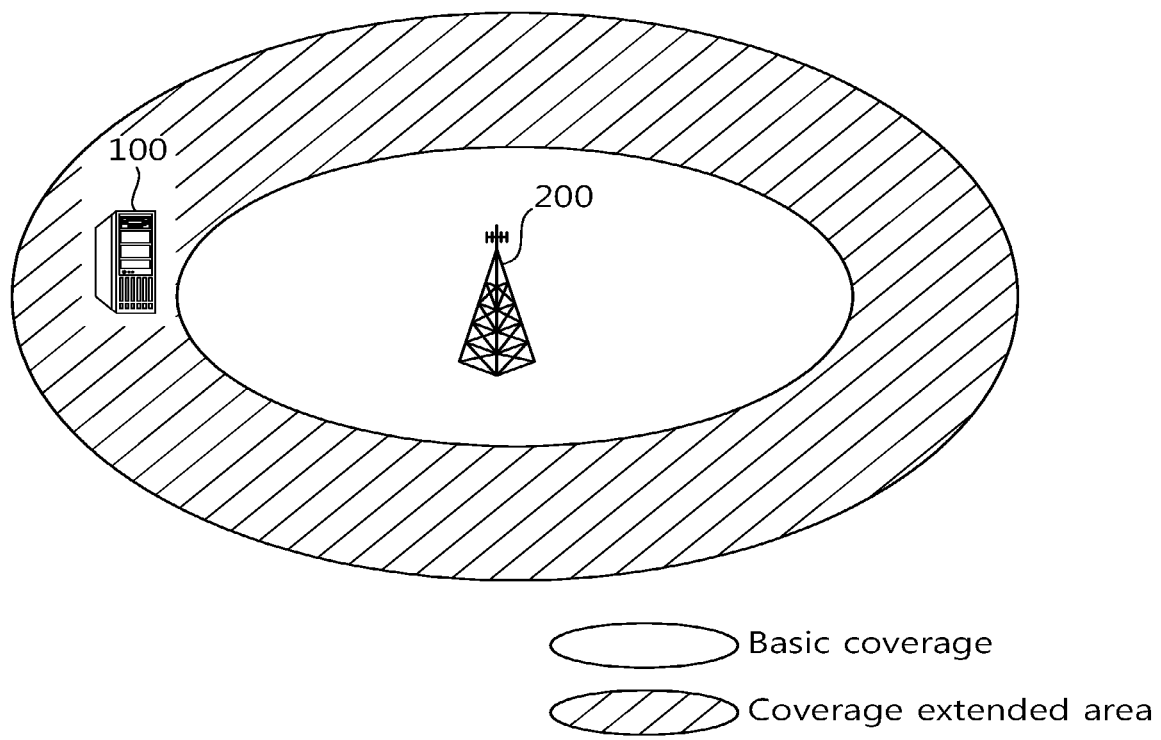
FIG. 6b illustrates an example of cell coverage extension or enhancement for an MTC UE.

FIG. 6b illustrates an example of cell coverage extension or enhancement for an MTC device.

In recent years, it is considered that cell coverage of the base station extends for the MTC device 100 and various techniques for the cell coverage extension or enhancement are discussed.

However, in the case where the coverage of the cell extends or increases, when the base station transmits a downlink channel to the MTC device positioned in a coverage extension (CE) or coverage enhancement (CE) area, the MTC device may have difficulty in receiving the downlink channel. Likewise, if the MTC device positioned in the CE region directly transmits an uplink channel, the base station has difficulty in receiving this.

To solve this problem, the downlink channel or the uplink channel may be repetitively transmitted on several subframes. The repetitive transmission of the uplink/downlink channel on the several subframes is referred to as bundle transmission.

Then, the MTC device or the base station can increase a decoding success rate by receiving a bundle of downlink/uplink channels on several subframes and decoding a part or entirety of the bundle.

Figure 7A:
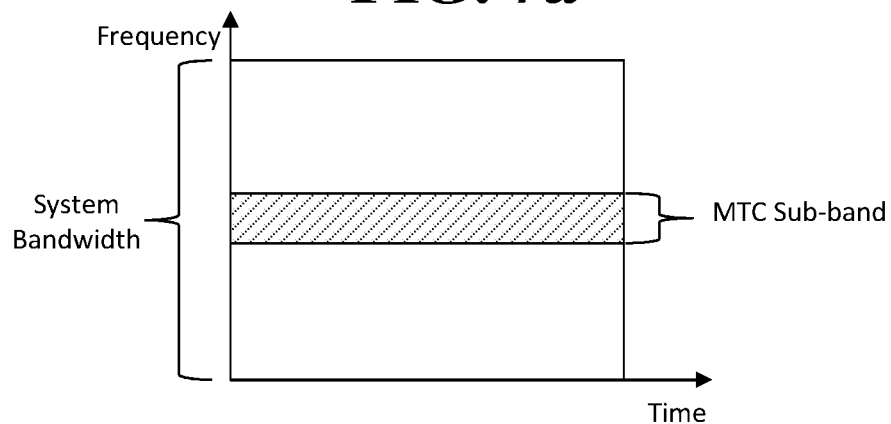
FIG. 7A and FIG. 7B illustrate examples of a narrowband in which an MTC device operates.
Figure 7B:
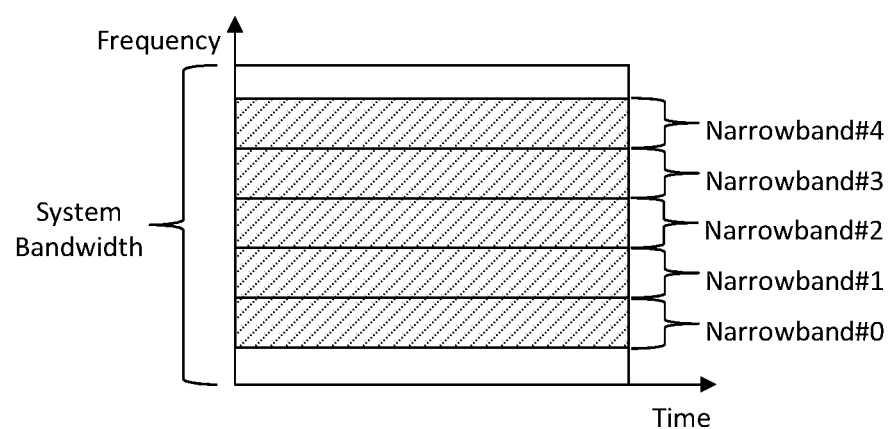

FIG. 7A and FIG. 7B illustrate examples of a narrowband in which an MTC device operates.

As one method for low-cost of the MTC device, as shown in FIG. 7A, the MTC device may operate at a bandwidth less than a system bandwidth of a cell. For example, the MTC device may use a narrowband of 1.4 MHz. However, without being limited thereto, the MTC device may use a narrowband of 180 kHz or 200 kHz.

In this case, a region of the narrowband in which the MTC device operates may be located in a central region (e.g., 6 PRBs in the center) of the system bandwidth of the cell as shown in FIG. 7A.

Alternatively, as shown in FIG. 7B, for multiplexing within a subframe between MTC devices, narrowbands for a plurality of MTC devices may be provided in one subframe so that the plurality of MTC devices use different narrowbands. In this case, most of the MTC devices may use narrowbands other than the central region (e.g., the 6 PRBs in the center) of the system band of the cell.

As such, MTC communication operating on a reduced bandwidth may be referred to as narrow band (NB)-IoT communication or NB-CIoT communication.

Figure 8:
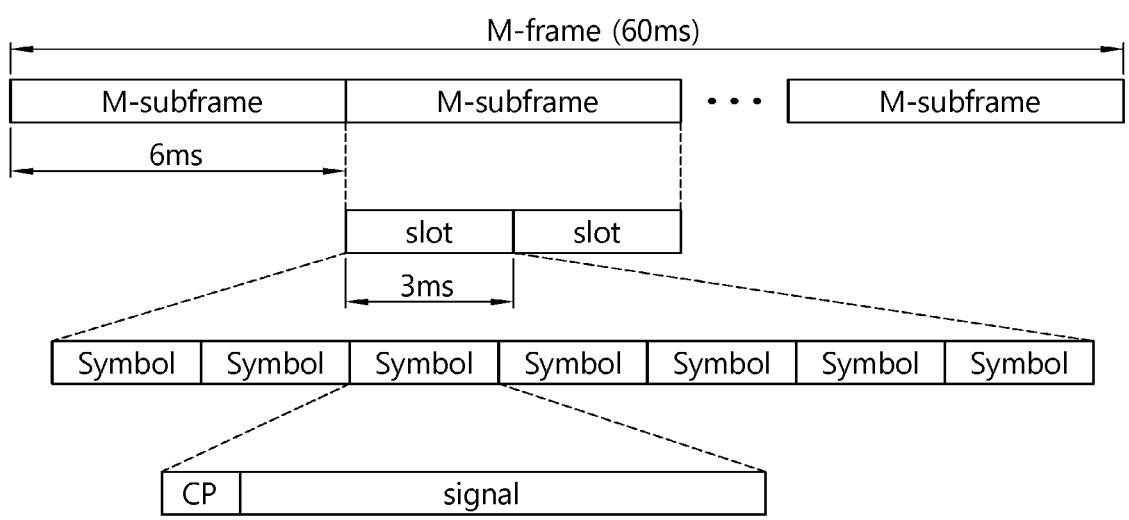
FIG. 8 illustrates an example of a time resource in an M-frame unit that can be used for MTC.

FIG. 8 illustrates an example of a time resource in an M-frame unit that can be used for MTC.

Referring to FIG. 8, a frame that can be used for MTC may be referred to as an M-frame, and may have a length of 60 ms for example. In addition, a subframe that can be used for MTC may be referred to as an M-subframe, and may have a length of 60 ms for example. Therefore, the M-frame may include 10 M-subframes.

Each M-subframe may include two slots, and each slot may be 3 ms for example.

However, unlike in FIG. 8, a slot that can be used for MTC may have a length of 2 ms. Accordingly, a subframe may have a length of 4 ms, and a frame may have a length of 40 ms.

Hereinafter, a device operating on a reduced bandwidth in accordance with low-complexity/low-capability/low-specification/low-cost is referred to as an MTC device. However, it is apparent that technical features described below can be performed on an NB-IoT device or an NB-CIoT device.

<Disclosure of the Present Specification>

As described above, the MTC device operates on a decreased bandwidth. As such, when the bandwidth for the MTC is decreased, a peak/average data rate may be limited. However, as the MTC is applied in various fields, there has been a need for a higher peak/average data rate.

Accordingly, the present specification proposes a method capable of providing flexibility or scalability for a data rate or available resource of an MTC device operating on a decreased bandwidth. In particular, the present specification proposes a method in which the MTC device operates on an extended narrowband or a plurality of narrowbands.

In the following description, the narrowband is a bandwidth that can be used when the MTC device performs transmission/reception, and may be less than or equal to a system bandwidth of a cell. In addition, the narrowband may consist of contiguous N physical resource blocks (PRBs). For example, although the narrowband may consist of 6 PRBs, without being limited thereto, it may consist of 1 PRB.

1. Method of Improving Data Rate of MTC Device

A method of extending a unit size of a narrowband may be considered as a method of increasing a data rate of an MTC device. For example, a unit size of a single narrowband for the MTC device may be increased to a multiple of 6, such as 12 RBs or 18 RBs. In the following description, the method of extending the unit size of the narrowband for the MTC device is referred to as extended narrowband Tx/Rx.

A method of configuring a plurality of circuits of a narrowband unit and increasing the number of narrowbands that can be simultaneously used by the MTC device may be considered as another method of increasing the data rate of the MTC device. In the following description, a method in which the MTC device simultaneously uses a plurality of narrowbands is referred to as multi-narrowband Tx/Rx. It is apparent that contiguous narrowbands can be configured or allocated also in case of the multi-narrowband Tx/Rx.

Hereinafter, the extended narrowband Tx/Rx and the multi-narrowband Tx/Rx will be described in more detail.

1-1. Extended Narrowband Tx/Rx Method

As a method in which an MTC device uses a narrowband having an increased unit size, a BS may indicate a unit size of a narrowband that can be used by the MTC device through high layer signaling.

Figure 9:
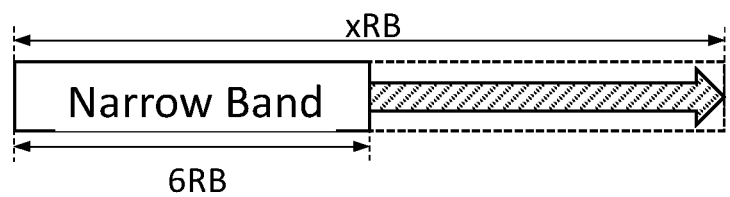
FIG. 9 illustrates an example of a narrowband extended for MTC according to the present specification.

FIG. 9 illustrates an example of a narrowband extended for MTC according to the present specification.

Referring to FIG. 9, for example, an MTC device using 6 PRBs may transmit/receive data by using X PRBs having an increased unit size in comparison with a narrowband currently being used, based on an indication of a BS. In this case, X may be a multiple of 6, such as 12, 18, etc., but is not limited thereto.

The BS may indicate any one of an index of a narrowband that can be used for the MTC device, a size of the narrowband, and the number of PRBs to indicate a unit size of an extended narrowband. For example, the BS may indicate it in a form of a combination of a starting RB index and ending RB index of the narrowband that can be used for the MTC device. Alternatively, the BS may indicate it in a form of a combination of a starting RB index and length of the narrowband that can be used for the MTC device. In this case, the length of the narrowband may be indicated by the number of PRBs. Alternatively, the BS may indicate the unit size of the narrowband that can be used for the MTC device in a form of a resource indication value (RIV). In this case, the RIV may be expressed as follows.

If $(L'_{CRBs}-1) \leq \lfloor N'^{DL}_{VRB}/2 \rfloor$, $RIV = N'^{DL}_{VRB}(L'_{CRBs}-1) + RB'_{start}$. Otherwise, $RIV = N'^{DL}_{VRB}(N'^{DL}_{VRB}-L'_{CRBs}+1) + (N'^{DL}_{VRB}-1-RB'_{start})$. In this case, $L'_{CRBs} = L_{CRBs}/N_{RB}^{step}$, $RB'_{start} = RB_{start}/N_{RB}^{step}$, $N'^{DL}_{VRB} = \lfloor N^{DL}_{VRB}/N_{RB}^{step} \rfloor$, where $L'_{CRBs}$ is greater than or equal to 1 and cannot exceed $N'^{DL}_{VRB}-RB'_{start}$. In addition, $L_{CRBs}$ is a size of contiguous RBs, and $N_{RB}^{step}$ is the number of RBs, which may be set by a higher layer or may be pre-set to 6.

The RIV form may be used as a reference for a narrowband index or size, instead of a reference for an RB index or size. In addition, although the present method has been described by exemplifying a case where the narrowband size is extended to a multiple of 6, the present method is not limited thereto and thus may be applied to a case where the narrowband size is extended based on the number of RBs such as 1, 7, 8, or the like.

As another method in which the MTC device uses a narrowband having an increased unit size, the BS may additionally indicate a configuration of a narrowband that can be used for the MTC device through higher layer signaling. In this case, the BS may configure narrowband information (e.g., narrowband size or index) for each physical channel or physical channel group.

Figure 10:
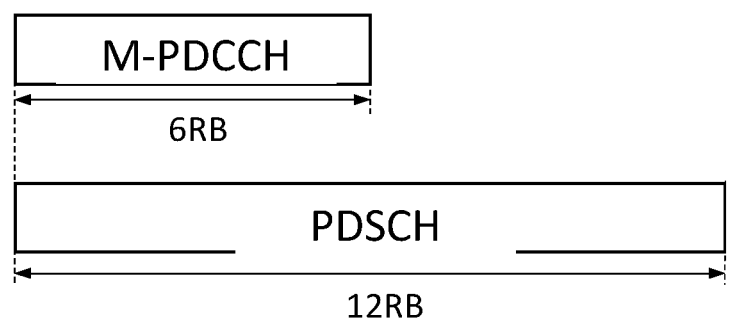
FIG. 10 illustrates an example of a narrowband configured differently for each physical channel according to the present specification.

FIG. 10 illustrates an example of a narrowband configured differently for each physical channel according to the present specification.

Referring to FIG. 10, for example, a BS may configure 6 RBs for an MTC-PDCCH (M-PDCCH), and may configure more than 6 RBs (e.g., 12 RBs, 18 RBs, etc.) for a PDSCH.

If the BS configures a narrowband having an increased unit size (e.g., a narrowband greater than 6 RBs) for the MTC device, the narrowband having the increased unit size may be additionally defined. Hereinafter, the narrowband having the increased unit size is referred to as a second narrowband.

The second narrowband may be defined based on a system bandwidth and a bandwidth size indicated through higher layer signaling. If the second narrowband is applied to PDSCH or PUSCH transmission, narrowband information indicated through downlink control information (DCI) may be information regarding the second narrowband. More specifically, the second narrowband may be determined as follows.

The second narrowband has a size of $N_{NB}=\lfloor N_{RB}/N_{NB}^{RB} \rfloor$. In this case, $N_{NB}$ is the number of RBs for a system bandwidth, and $N_{NB}^{RB}$ is the number of RBs constituting a narrowband. The second narrowband may be numbered in a form of $n_{NB}=0, \ldots, N_{NB}-1$, and may be configured with a PRB index described below.

$$\begin{cases} N_{NB}^{RB} n_{NB} + i_0 + i, & \text{if } N_{RB} \bmod 2 = 0 \\ N_{NB}^{RB} n_{NB} + i_0 + i, & \text{if } N_{RB} \bmod 2 = 1 \text{ and } n_{NB} < N_{NB}/2 \\ N_{NB}^{RB} n_{NB} + i_0 + i + 1, & \text{if } N_{RB} \bmod 2 = 1 \text{ and } n_{NB} \geq N_{NB}/2 \end{cases}$$

In this case, $i=0, \ldots, N_{NB}^{RB}-1$, and $i_0=\lfloor N_{RB}/2 \rfloor - N_{NB}^{RB} N_{NB}/2$.

In this case, according to the number of PRBs constituting the system bandwidth, there may be resources that cannot be utilized as a primary narrowband (e.g., a narrowband having a size of 6 RBs) or a second narrowband.

Unlike this, instead of additionally defining the second narrowband, the BS may configure the second narrowband by indicating a functional expression for the primary narrowband or a resource region that can be used for a specific physical channel (e.g., PDSCH or PUSCH).

For example, the second narrowband may be configured as a starting narrowband index and a narrowband size. In this case, the starting narrowband index may be an index for the primary narrowband. In this case, the second narrowband may be configured as a size corresponding to the narrowband size, starting from the starting narrowband index. The second narrowband may include one or a plurality of primary narrowbands. Alternatively, the second narrowband may include a PRB which is not configured as the primary narrowband within a system bandwidth.

More specifically, according to information regarding the starting narrowband index or the narrowband size, the second narrowband may include one or $i_0$ PRBs having indices lower than the configured narrowband. Herein, the configured narrowband may have an index 0, or may be a narrowband based on a minimum integer value among values greater than or equal to $N_{RB}/2$.

The information regarding the starting narrowband index and the narrowband size may all be indicated through DCI. Alternatively, only the starting narrowband index may be indicated through the DCI, and the narrowband size may be indicated through higher layer signaling. In this case, considering that a field size for resource allocation in the DCI is changeable depending on the narrowband size, it may be advantageous to indicate the narrowband size through the higher layer signaling.

In the case of the aforementioned extended narrowband Tx/Rx, there may be a limitation in that a time of changing a narrowband configuration (e.g., a narrowband size, the number of PRBs, etc.) is ambiguous. To solve this, some control channels or data channels may be transmitted/received according to an initial configuration (e.g., a configuration for the primary narrowband).

1-2. Multi-Narrowband Tx/Rx Method

As a method in which an MTC device simultaneously uses a plurality of narrowbands, a BS may indicate information regarding an additional narrowband other than a narrowband currently used by the MTC device, through higher layer signaling. Hereinafter, the narrowband currently used by the MTC device is referred to as a primary narrowband, and the additional narrowband other than the primary narrowband is referred to as a secondary narrowband.

Figure 11:
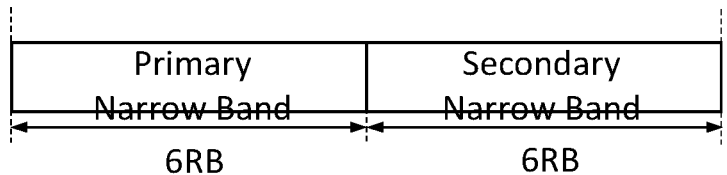
FIG. 11 illustrates an example of a primary narrowband and a secondary narrowband according to the present specification.

FIG. 11 illustrates an example of a primary narrowband and a secondary narrowband according to the present specification.

A BS may indicate information regarding each of the primary narrowband and the secondary narrowband in a form of a starting narrowband index and a narrowband size. Alternatively, the BS may indicate the information regarding each of the primary narrowband and the secondary narrowband in a form of a bitmap capable of expressing all or some narrowband indices existing on a system bandwidth.

For example, if there are 8 narrowbands on the system bandwidth, the BS may indicate the primary narrowband and the secondary narrowband through an 8-bit bitmap. Alternatively, if the primary narrowband and the secondary narrowband are adjacent bands, the BS may indicate a narrowband starting position, a narrowband size, a narrowband stepwise size change value, or the like to select a narrowband to be used by the MTC device. Alternatively, the BS may indicate the primary narrowband and the secondary narrowband in a form of RIV.

This method may be applied when the primary narrowband and the secondary narrowband belong to the same cell, and may also be applied when the primary narrowband and the secondary narrowband belong to different cells. Alternatively, although a case where each of a plurality of narrowbands has a size of 6 RBs is described for example, without being limited thereto, the present method may also be applied to a case where the plurality of narrowbands have different sizes such as 1 RB, 7 RBs, 8 RBs, or the like.

In the aforementioned case where a method of improving a data rate of an MTC device is applied to a downlink, one of configured narrowbands may correspond to a common search space (CSS), and the remaining narrowbands may correspond to a UE-specific search space (USS). All narrowbands may correspond to the USS. Alternatively, it may be limited such that only a primary narrowband corresponds to the CSS.

For example, the MTC device may receive control information (e.g., M-PDCCH) from one of a plurality of narrowbands received simultaneously, and may receive data information (e.g., PDSCH) through another narrowband. In this case, the data information may be data information corresponding to the control information received simultaneously or data information corresponding to previously received control information.

That is, the MTC device may perform an operation for monitoring the M-PDCCH differently in a corresponding narrowband according to a configuration relation of a search space and a narrowband. For example, the MTC device may monitor the M-PDCCH in both the CSS and the USS with respect to the primary narrowband. In addition, the MTC device may monitor the M-PDCCH only in the USS with respect to other narrowbands.

When the method of improving the data rate of the MTC device is applied to an uplink, one of configured bandwidths may correspond to an uplink control channel (e.g., PUCCH), and the remaining narrowbands may correspond to an uplink data channel (e.g., PUSCH). All narrowbands may correspond to the uplink data channel. Alternatively, it may be limited such that only the primary narrowband corresponds to the uplink control channel.

In general, MTC may be applied in a situation where there is more uplink traffic than downlink traffic. Therefore, it may be configured such that the number of narrowbands for downlink is greater than the number of narrowbands for uplink. Basically, in an uplink case, it may be configured to have a form of contiguous narrowbands to maintain a single carrier property or the like. In this case, a narrowband configuration for downlink and a narrowband configuration for uplink may be performed independently. For example, the narrowband for downlink may be basically configured in a non-contiguous form, and the narrowband for uplink may be basically configured in a contiguous form.

2. Method of Configuration for Multi-Narrowband Tx/Rx

When a method of transmission/reception based on an extended narrowband is used among methods for improving a data rate of an MTC device, a transmission mode (TM), a transport block (TB), or the like may be configured in a singular manner in unit of the MTC device. If a plurality of narrowbands belong to the same cell, then the TM, the TB, or the like may also be configured in a singular manner in all narrowbands also in case of a method of transmission/reception based on multiple narrowbands. That is, even if a primary narrowband consists of non-contiguous PRB pairs or NBs, the same TB is applied, and the same TB may be mapped for non-contiguous resources. However, if a plurality of narrowbands belong to different cells, the TM or the TB may be independently configured for each narrowband.

More specifically, in case of a TB which is defined in a singular manner for a plurality of narrowbands, it may be regarded that simply the same TB is transmitted through an increased bandwidth. In this case, resource allocation may be performed in a form of one great bandwidth in which a plurality of narrowbands are aggregated. In addition, a hybrid automatic repeat request (HARQ) procedure may also be performed in a singular manner for the plurality of narrowbands.

Unlike this, when respective RBs exist for the plurality of narrowbands, the resource allocation may be performed based on a size of each narrowband. In addition, the HARQ procedure may is performed independently for each narrowband. In this case, an HARQ-ACK bit may also exist independently for each narrowband. For example, when two narrowbands are configured from a BS and a TB exists for each narrowband, the MTC device may simultaneously transmit respective HARQ-ACK bits through a PUCCH format 1b. Alternatively, the MTC device may bundle each HARQ-ACK bit with 1 bit through an AND operation and then transmit it through a PUCCH format 1a.

Meanwhile, in case of CSS, a primary narrowband may be used in transmission in order not to have an effect on the existing MTC device in the mapping of the M-PDCCH. However, in case of USS, a plurality of narrowbands may be used in transmission since a location of a search space may vary depending on cell-radio network temporary identities (C-RNTIs) and it may be designed only for a specific MTC device. In this case, improvement in a frequency diversity gain may be expected. In addition, a possibility that several MTC devices have overlapping search spaces may be decreased even in a single narrowband situation.

Unlike this, a mapping region may be configured in a narrowband unit in the mapping of the M-PDCCH. For example, one M-PDCCH may be transmitted through one narrowband. In particular, when the TB is designated for each narrowband, it may be preferable to configure an M-PDCCH region for each narrowband in terms of network efficiency or flexibility.

3. Method of Supporting Multi-Narrowband of Different Radio Access Technology (RAT)

In a next-generation system, a plurality of RATs may be supported depending on an application field or application target of the system. In this case, the RAT may include LTE, MTC, NB-IoT, NB-CIoT, or the like.

In this case, a suitable RAT may be configured for downlink traffic and uplink traffic according to each situation. In particular, different RATs may be configured for a narrowband for downlink and a narrowband for uplink.

For example, data may be received based on LTE in downlink, while data is transmitted through NB-IoT in uplink. In addition, data may be received through NB-IoT in downlink, while data is transmitted through MTC in uplink.

Meanwhile, even if communication for the plurality of narrowbands is achieved in the same direction, i.e., either downlink or uplink, a different RAT may be used for each narrowband. For example, a UE may be configured with both a narrowband corresponding to MTC and a narrowband corresponding to NB-IoT, and may transmit/receive data simultaneously through both the narrowband corresponding to MTC and the narrowband corresponding to NB-IoT.

Therefore, information regarding an RAT corresponding to each narrowband may be included in information regarding a narrowband through which a UE capable of transmitting data through a plurality of narrowbands receives data from a BS. In this case, the information regarding the narrowband may further include information regarding a narrowband starting position, narrowband index, narrowband size, physical cell ID (PCID), or the like for each narrowband. In addition, the information regarding the narrowband may further include information regarding whether each narrow band includes CSS, whether it is a primary narrowband/secondary narrowband or the like.

Figure 12:
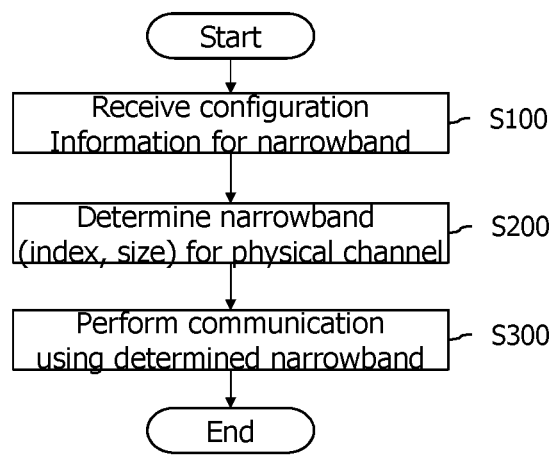
FIG. 12 is a flowchart illustrating a method of performing MTC communication according to a disclosure of the present specification.

FIG. 12 is a flowchart illustrating a method of performing MTC communication according to a disclosure of the present specification.

Referring to FIG. 12, an MTC device receives configuration information for a narrowband from a BS (S100). In this case, the configuration information may include information regarding at least one narrowband that can be used for each at least one physical channel.

More specifically, the at least one narrowband may have a size greater than or equal to 6 RBs. In this case, the at least one narrowband may include an RB that cannot be configured by a narrowband having a unit size of 6 RBs among RBs in a full system bandwidth.

In addition, the configuration information transmitted by the BS may include a narrowband index and narrowband size for each of the at least one narrowband. In this case, the narrowband index may be received through DCI, and the narrowband size may be received through higher layer signaling. Therefore, it may be considered that a field size for resource allocation in the DCI is changed depending on the narrowband size.

The MTC device determines a narrowband for a physical channel to be used in communication, on the basis of the received configuration information (S200). That is, the MTC device may determine a narrowband size or index for each physical channel on the basis of the received configuration information. In this case, if at least two physical channels are used in MTC communication and types of the at least two physical channels are different from each other, the MTC device may determine a plurality of narrowbands having different sizes.

In addition, the MTC device performs communication for the physical channel by using the determined narrowband (S300). In this case, if the narrowband changes in size when the physical channel is changed from a first channel to a second channel, the MTC device may transmit/receive a part of the first channel or the second channel by using a primary narrowband (e.g., a narrowband consisting of 6 RBs) instead of conforming to the configuration information received from the BS. Therefore, it is possible to solve a limitation in which a time of changing a configuration for the narrowband is ambiguous.

The aforementioned embodiments of the present invention can be implemented through various means. For example, the embodiments of the present invention can be implemented in hardware, firmware, software, combination of them, etc. Details thereof will be described with reference to the drawing.

Figure 13:
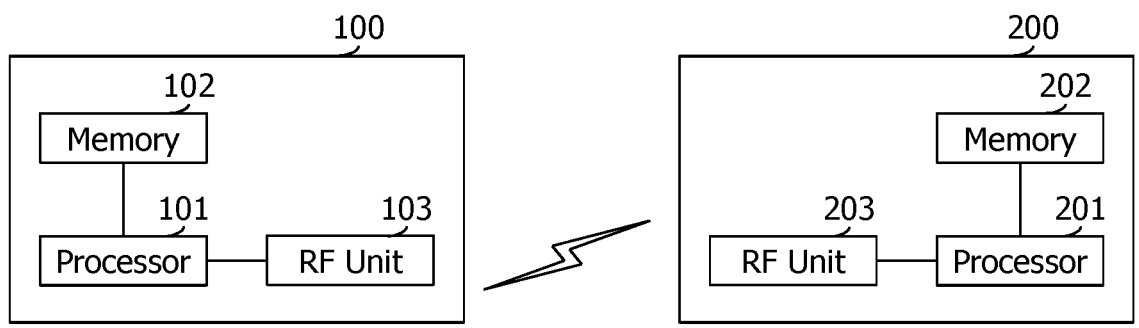
FIG. 13 is a block diagram showing a wireless communication system according to a disclosure of the present specification.

FIG. 13 is a block diagram showing a wireless communication system which implements the present invention.

The base station 200 includes a processor 201, a memory 202, and a radio frequency RF unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

The wireless device (E.g., MTC device) 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method.

The processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for receiving data, the method performed by a user equipment (UE) and comprising:
    receiving control information related to a downlink channel,
    wherein the control information includes first information and second information, which are related to a narrowband to be used for the downlink channel,
    wherein the first information is an index of a starting narrowband, and
    wherein the second information is a bitmap informing one or more additional narrowband among a plurality of narrowbands following the starting narrowband in frequency domain; and
    receiving data through the downlink channel based on at least one narrowband,
    wherein the at least one narrowband is allocated based on the index of the starting narrowband and the bitmap informing the one or more additional narrowband.

2. The method of claim 1, wherein the starting narrowband or the one or more additional narrowband has a size greater than 6 resource blocks (RBs).

3. The method of claim 1, wherein the starting narrowband or the one or more additional narrowband includes an RB which cannot be configured by a narrowband of which a unit size is 6 RBs, among RBs in a full system bandwidth.

4. The method of claim 1,
    wherein the first information includes size of the starting narrowband, and
    wherein the second information includes size of the one or more additional narrowband.

5. The method of claim 4, wherein the first information and the second information are received based on higher layer signaling.

6. The method of claim 1,
    wherein the control information includes information related to at least two narrowbands to be used for each of at least two downlink channels, and
    wherein based on that types of the at least two downlink channels are different from each other, the at least two narrowbands have different sizes.

7. The method of claim 1, wherein based on that a size of the narrowband is changed based on a change of the downlink channel from a first channel to a second channel, a part of the first channel or the second channel is received based on a narrowband constructed of 6 RBs without having to conform to the control information.

8. A machine type communication (MTC) device for receiving data, the MTC device comprising:
    a transceiver; and
    a processor operatively coupled to the transceiver, wherein the processor is configured to:
    control the transceiver to receive control information related to a downlink channel,
    wherein the control information first information and second information, which are related to a narrowband to be used for the downlink channel,
    wherein the first information is an index of starting narrowband, and
    wherein the second information is a bitmap informing one or more additional narrowband among a plurality of narrowbands following the starting narrowband in frequency domain; and
    control the transceiver to receive data through the downlink channel based on at least one narrowband,
    wherein the at least one narrowband is allocated based on the index of the starting narrowband and the bitmap informing the one or more additional narrowband.

9. The MTC device of claim 8, wherein the starting narrowband or the one or more additional narrowband has a size greater than 6 resource blocks (RBs).

10. The MTC device of claim 8, wherein the starting narrowband or the one or more additional narrowband comprises an RB which cannot be configured by a narrowband of which a unit size is 6 RBs, among RBs in a full system bandwidth.

11. The MTC device of claim 8,
wherein the first information includes size of the starting narrowband, and
wherein the second information includes size of the one or more additional narrowband.

12. The MTC device of claim 11, wherein the first information and the second information are received based on higher layer signaling.

13. The MTC device of claim 8,
wherein the control information includes information related to at least two narrowbands to be used for each of at least two downlink channels, and
wherein based on that types of the at least two downlink channels are different from each other, the at least two narrowbands have different sizes.

14. The MTC device of claim 8, wherein based on that a size of the narrowband is changed based on a change of the downlink channel from a first channel to a second channel, a part of the first channel or the second channel is received based on a narrowband constructed of 6 RBs without having to conform to the control information.

* * * * *